United States Patent
Ramírez Sabag et al.

(10) Patent No.: US 11,149,187 B2
(45) Date of Patent: Oct. 19, 2021

(54) COMPOSITION OF ORGANIC GEL FORMULATIONS FOR ISOLATION OF HIGH TEMPERATURE AND SALINITY PETROLEUM RESERVOIR ZONES

(71) Applicant: Instituto Mexicano del Petroleo, Mexico City (MX)

(72) Inventors: Jetzabeth Ramírez Sabag, Mexico City (MX); Alejandro Ortega Rodriguez, Mexico City (MX); Norma Araceli García Muñoz, Mexico City (MX); Maribel Amador Ramírez, Mexico City (MX); Ana Patricia Medina Montiel, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days.

(21) Appl. No.: 16/512,042

(22) Filed: Jul. 15, 2019

(65) Prior Publication Data

US 2021/0017444 A1   Jan. 21, 2021

(51) Int. Cl.
   *C09K 8/588*   (2006.01)
   *C08K 5/42*    (2006.01)
   *C08L 33/26*   (2006.01)

(52) U.S. Cl.
   CPC ............... *C09K 8/588* (2013.01); *C08K 5/42* (2013.01); *C08L 33/26* (2013.01); *C08L 2201/56* (2013.01)

(58) Field of Classification Search
   None
   See application file for complete search history.

(56) References Cited

U.S. PATENT DOCUMENTS

| 4,095,651 | A | 6/1978 | Chauveteau et al. |
| 4,507,440 | A | 3/1985 | Engelhardt et al. |
| 4,718,491 | A | 1/1988 | Kholer et al. |
| 5,905,100 | A | 5/1999 | Moradi-Araghi |

(Continued)

FOREIGN PATENT DOCUMENTS

EP   2126016 A2   12/2009

OTHER PUBLICATIONS

Lockhart | Chemical Properties of Chromium/Polyacrylamide Gels. SPE Advanced Technology Series (1994), vol. 2, No. 2, pp. 199-205.

(Continued)

*Primary Examiner* — Jeffrey D Washville
(74) *Attorney, Agent, or Firm* — Jason P. Mueller; FisherBroyles, LLP

(57) ABSTRACT

This disclosure relates to an organic gel formulation composition for blocking fluids in naturally fractured carbonate reservoirs, for salinity conditions up to 31,870.50 ppm of total dissolved solids and temperatures up to 120° C., that is, for the purpose temporarily isolating areas of the reservoirs, that will be treated with chemical and radioactive products to quantify the oil remaining in them, the stability of the gel is controlled in a certain period of time, through the synergic effect of the supramolecular interaction between the components of the gel formulation. A disclosed composition may include 0.3 to 1% by weight of a copolymer of acrylamide butyl tertiary of sulfonic acid and acrylamide, and 0.12 to 0.4% by weight of phenol and from 0.18 to 0.6% by weight of hexamethylenetetramine.

8 Claims, 12 Drawing Sheets

(56) References Cited

U.S. PATENT DOCUMENTS 6,465,397 B1    10/2002  Patterson
2019/0119559 A1*  4/2019  O'Toole .................. E21B 43/20

OTHER PUBLICATIONS

Seright | Washout of Cr(III)-Acetate-HPAM Gels from Fractures. SPE International Symposium on Oilfield Chemistry held in Houston, Texas, Feb. 5-7, 2003, pp. 1-10.

Simjoo et al. | Water Shut-Off in a Fractured System using a Robust Polymer Gel. SPE European Formation Damage Conference held in Schebeningen, The Netherlands, May 27-29, 2009; pp. 1-8.

Moradi-Araghi et al. | Hydrolysis and Precipitation of Polyacrylamides in Hard Brines at Elevated Temperatures. SPE Reservoir Engineering, May 1987, pp. 189-198.

Moradi-Araghi | Application of Low-Toxicity Crosslinking Systems in Production of Thermally Stable Gels. SPE/DOE Ninth Symposium held in Tulsa, Oklahoma, Apr. 17-20, 1994, pp. 483-491.

Moradi-Araghi et al. | Hydrolysis and Precipitation of Polyacrylamides in Hard Brines at Elevated Temperatures. SPE Reservoir Engineering, May 1984, pp. 189-198.

Hardy et al. | The First Carbonate Field Application of a New Organically Crosslinked Water Shutoff Polymer System SPE International Symposium on Oilfield Chemistry held in Houston, Texas, Feb. 16-19, 1999, pp. 1-16.

Albonico et al. | Studies on Phenol-Formaldehyde Crosslinked Polymer Gels in Bulk and in Porous Media. SPE International Symposium on Oilfield Chemistry held in San Antonio, Texas, Feb. 14-17, 1995, pp. 403-415.

Sydansk | A New Conformance-Improvement-Treatment Chromium (III) Gel Technology. SPE/DOE Enhanced Oil Recovery Symposium held in Tulsa, Oklahoma, Apr. 17-20, 1998, pp. 99-114.

* cited by examiner

COMPOSITION OF ORGANIC GEL FORMULATIONS FOR ISOLATION OF HIGH TEMPERATURE AND SALINITY PETROLEUM RESERVOIR ZONES

CROSS-REFERENCE TO RELATED APPLICATIONS

This application claims priority to Mexican Patent Application No. MX/a/2018/009309, filed Jul. 31, 2018, the entire contents of which is incorporated herein by reference.

FIELD OF INVENTION

This disclosure describes an organic gel formulation composition for the blocking of naturally fractured carbonate reservoir fluids at salinity conditions up to 31,870.50 ppm of total dissolved solids and temperatures until 120° C., that is in order to temporally isolate reservoir areas that will be treated with chemical and radioactive products for quantification of remaining oil in them, the stability of the gel is controlled in a certain period of time, through the synergic effect of the supramolecular interaction between the components of the gel formulation.

BACKGROUND

A gel is a colloidal system where the continuous phase is solid, and the dispersed phase is liquid. The gels have a similar density to liquids; however, their structure resembles much more solids. The most common example of gel is edible gelatin. They have a wide application field at industrial level. In oil industry, the use of gels has been extended to naturally fractured reservoirs and its main application has been in conformance control, enhanced recovery processes, as well as permeability modifiers, such as diverging, fracture sealants for hydraulic fracturing and as isolators. In these applications, the stability of the gel plays an extremely important role and it depends on the chemical structure of the gel, in addition to the conditions of temperature, pressure and salinity that are held in the reservoir.

Nowadays, the use of polymer-based gels is one of the main techniques within of chemical methods used in the oil industry. Most gels reported in literature are polyacrylamide base or acrylamide-based copolymers with inorganic or organic cross-linkers such as Cr (III) (i), Al (III) salts, among others, used to form an inorganically cross-linked gelled system; these gels are the result of the ionic bond between the negatively charged carboxylate groups and the positive charge of the polyvalent ions (ii). However, the formation time of the most used gelled systems such as chromium (III) acetate/partially hydrolyzed polyacrylamide (PHPAM) is approximately only 5 hours at 40° C., which is insufficient to place the gel in the bottom of the formation in wells with too deep production intervals. Procedures have been reported to increase gel formation time by using stronger cross linkers such as malonate and glycolate (iii) anions, to make their placement possible, however, the loss of consistency could also occur when the binding with Cr (III)) becomes too strong, in addition to the ionic bonds being unstable at temperatures higher than 70° C. (iv).

Organic cross-linkers have been used to obtain gels that are stable in reservoirs with a temperature range greater than 90° C., however, at temperatures above 100° C., the polyacrylamide base polymers present hydrolysis as a consequence of the oxidative degradation of the polymer chains (v), this coupled with the presence of polyvalent ions in the medium, promotes the expulsion of water from the structure of the gel, which is known as syneresis.

Unlike inorganic cross-linkers, the gelation mechanism of organic cross-linkers is through covalent bonds, which are by far more stable than the ionic bond. Acrylamide base copolymers with organic crosslinking agents, such as phenol formaldehyde, can be used to form a gel with thermal stability and adjustable gelation time (vi), however there is controversy regarding its toxicity. Hardy and others report the use of a system of low toxicity formed by a copolymer of acrylamide and terbutil acrylate (PAtBA), with polyethyleneimine (PEI) as a cross linking agent, it is stable at high temperatures, however there are serious complications in its placement and use due mainly to its rapid cross linking kinetics that in a certain proportion can be controlled with the use of salts that provide the medium with monovalent ions that retard crosslinking, as well as its consistency too rigid, besides being prohibitive due to the high cost of the cross linker (vii)(viii). Among the most recently used methods is the secondary cross linking method, which can also increase gel strength and improve its strength, using more than one crosslinking agent acting in a first stage to facilitate the placement of the system and subsequently the second cross linker, will give the definitive consistency at the bottom of naturally fractured reservoirs (ix).

As it has been shown, the treatment with gelling polymeric systems has been widely implemented to improve the efficiency of volumetric sweeping in reservoirs or to reduce the excessive water production, among others.

The patents recognized by the applicant, which protect the main chemical families of the materials used to generate the gel and the use respectively, are:

a) U.S. Pat. No. 5,905,100 describes the gelation of acrylamide contained in a polymer with hexamethylenetetramine and an aminobenzoic acid or phenol compound, as a permeability reducer. Ahmad Morandi—Araghi., relates the gelation of a water-soluble polymer with an organic cross-linking agent used in hydrocarbon field operations. It provides a less toxic environment in its system of cross-linking, reducing permeability at high temperature of formation, by use of a system formed by a noble cross-linker and a water-soluble polymer, composed of hexamethylenetetramine, a cross-linker, aminobenzoic acid and phenol and an water-soluble acrylamide polymer.

b) U.S. Pat. No. 6,465,397 B1 refers to solutions of water-soluble copolymers used to modify the permeability of water in hydrocarbon-producing underground formations. The copolymer includes copolymerized synthetic cross-linker, which has an intra and inter molecular balance, which can be injected. Being a homogeneous aqueous solution of copolymerized amide acrylic and a vinyl sulfonated co-monomer and a quantity of non-ionic cross-linker.

c) In U.S. Pat. 4507440, Friedrich Engelhardt, Steffen Piesch, Juiane Balzer, and Jeffery C. Dawson discuss the water-soluble polymers used in the improved oil recovery, which are cross-linked by adding an acid. These polymers are used in acid stimulations in oil and gas reservoirs. The polymers contain co-polymerized acrylamide and co-monomers of the formyl-amido type. The content of HCl in the mixture of the water-soluble copolymer such as the copolymer 2-acrylamido-2-methylpropanesulfonic acid-acrylamido-N-vinyl-N-methylacetamide and another as the copolymer acrylic acid-vinyl formamido-vinyl pyrrolidone. The cross-linked gels are stable on days at 20-30° C. in an acid medium but there are easily hydrolyzed at 80-90° C.

d) In U.S. Pat. No. 4,718,491, Norbert Kholer talks about the use of polysaccharides, which are difficult to inject into porous spaces to slow or reduce the water inflow, but they allow an incomplete exploitation in the oil reservoirs. Its effect is lost at high temperatures.

e) In US patent U.S. Pat. No. 4,095,651, Guy Chauveteau discusses the use of hydrolyzed polyacrylamide. In this type of polymers, it is more effective for water with low salt content, degrading rapidly with the increase of salts, with the presence of polyvalent ions, these polymers have a tendency to form precipitates at high temperatures that can close the pores of the formation rocks.

f) Patent EP 2,126,016 A2 mentions an aqueous base insulating fluid comprising an aqueous base fluid, a water miscible organic liquid and a synthetic polymer, optionally a crosslinking agent is added to the mixture comprising the synthetic polymer to crosslink the same, the mixture comprising the synthetic polymer can be placed in a selected location, allowing the mixture comprising the synthetic polymer is activated to form a gel there.

In none of the aforementioned references is claimed, the development of composition of organic gel formulations for the blocking of fluids in naturally fractured carbonate reservoirs, for salinity conditions up to 31,870.50 ppm of total dissolved solids and temperatures up to 120° C., in order to isolate temporarily zones of reservoirs that will be treated with chemical and radioactive products in order to quantify the oil remaining in them.

It is, therefore, the object of the this disclosure to provide a composition of high temperature and salinity organic gel formulations for isolating oil reservoir zones. This disclosure relates to the formulation of two organic insulating fluids for temporary blockage in naturally fractured carbonates reservoirs, for salinity conditions (31,870.50 ppm of total dissolved solids) and temperature (120° C.), in order to control the stability of the gel in a certain period of time (considering 24 hours of placement, 8 weeks of permanence to subsequently degrade), through the synergistic effect of the organic cross-linking interaction between the components of the formulation, in order to isolate an area from the reservoir rock for a control volume injection.

BRIEF DESCRIPTION OF THE DRAWINGS

In order to have a greater understanding regarding the composition of high temperature and salinity organic gel formulations to isolate oil reservoirs zones of the present disclosure, the following, the contents of the accompanying drawings are briefly described.

DETAILED DESCRIPTION

This disclosure relates to a composition of organic gel formulations for the blocking of fluids in carbonated naturally fracture reservoirs, having a stabilizing effect for a gelation system at high temperature of 120° C. and 31,870.5 ppm dissolved total solids of salinity as NaCl, this gelation system to serve as a barrier between the formation water and injected fluid, in order to isolate the reservoir zone and facilitate the quantification of the remaining oil by use of tracers in carbonated naturally fracture reservoirs at high temperature and salinity condition, considering 24 hours of placement, and 8 weeks of permanence, to finally degrade.

Figure 20:
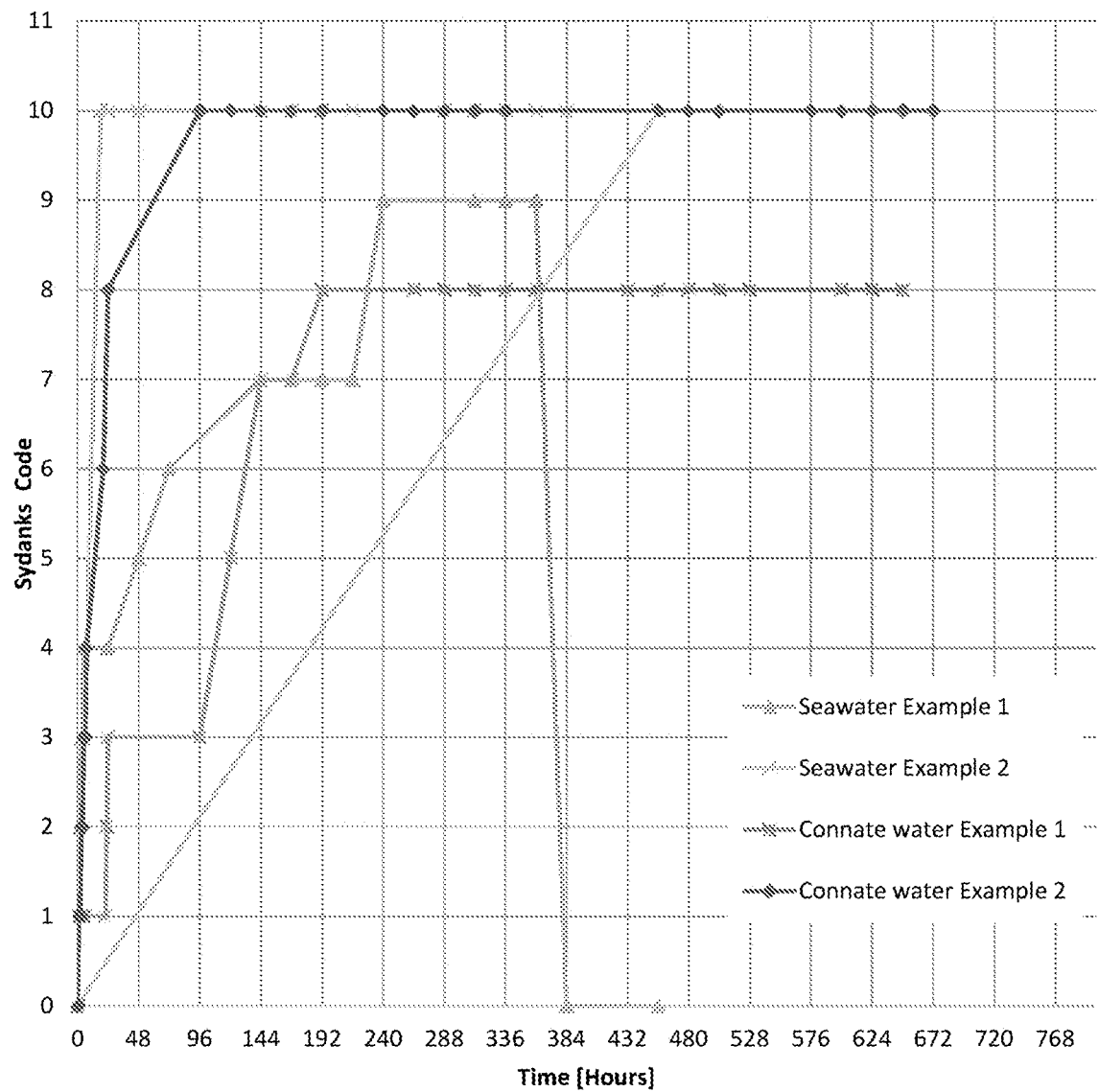
FIG. 20 illustrates a comparative graph of the investment resistance of the formulations described in Example 1 and Example 2 at different salinities.

The composition of the disclosure can be used where is compatibility with the congenital water of the carbonated naturally fracture reservoir, in addition, it also woks properly where a production assurance or improved oil recovery process is carried out and can be supplied through an injector producer well (FIG. 20).

For the development processing of the disclosure the following procedure was followed: 1) evaluation of the stability of the gelling formulation at temperature conditions 120° C.; 2) characterization of the gelling formulation: a) Measurement of the viscosity (21° C.), and b) Determination of the Rheological Model of the gelling formulation at average reservoir condition, pressure 2,000 psi and temperature 120° C.; and 3). Monitoring the progress of cross linking and permanence of the gelling formulation at 30° C. and atmospheric pressure, using rheological tests.

EXAMPLES

Some examples are given below of the application of organic gel formulations composition for blocking of fluids in carbonated naturally fracture reservoirs, in accordance with the disclosure, it being understood that said examples are illustrative only and are not intended to limit the scope of the disclosure.

1) Evaluation of the stability gellant formulation at 120° C.

The evaluation of the stability gelling formulation consisted in evaluating different chemical products based on polyacrylamides in an air convention oven at a temperature of 120° C. and using the code development by Robert Sydanks in 1988, to evaluate the qualitative variation of the behavior of the apparent viscosity.

Figure 1:
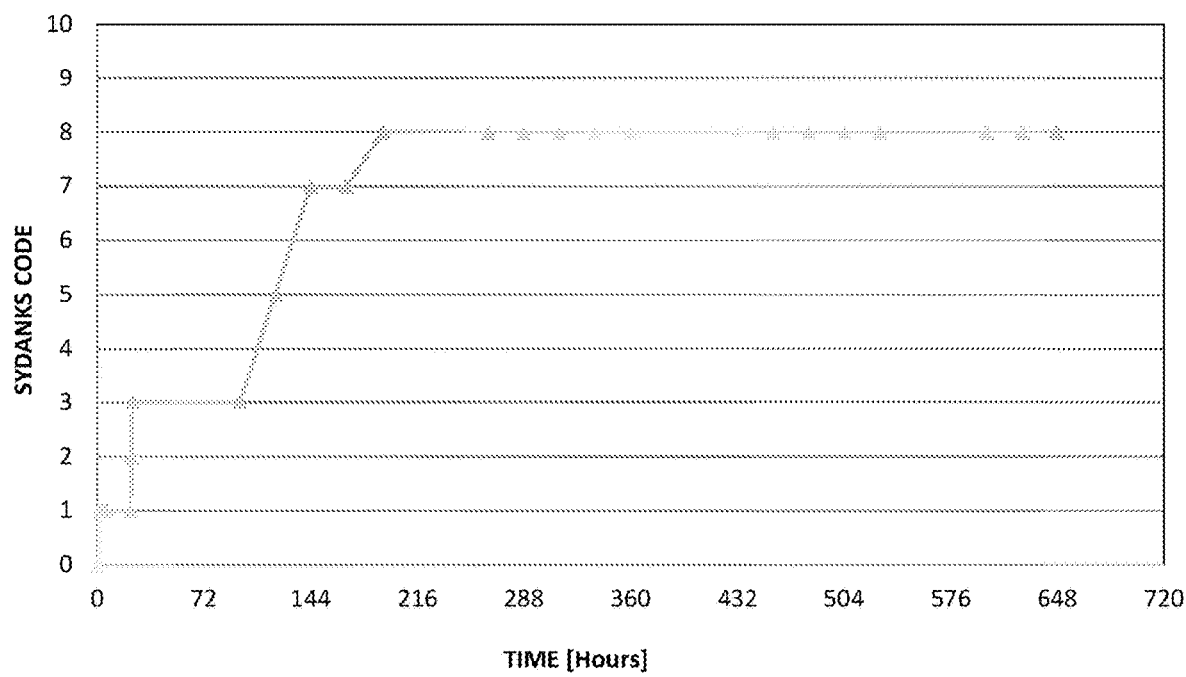
FIG. 1 shows the resistance to inversion of the formulation described in Example 1 at 120° C. as a function of time, according to the description developed by Robert Sydanks (1988).

Example 1. In a 100 ml flask equipped with a magnetic stirrer, it is diluted at room temperature and atmospheric pressure, 0.3% weight of copolymer of acrylamide butyl tertiary sulfonic acid (ATBS) and acrylamide, 0.12% weight of phenol and 0.18% weight of hexamethylenetetramine in 99.4% weight of reservoir brine with a total solids content of 31,870.50 ppm. The FIG. 1 shows, the behavior of the code developed by R. Sydanks (1988), of the aforementioned formulation at 120° C. as a function of time, prepared with brine at 0.3% weight of the polyacrylamide described above, 0.12% weight of phenol and 0.18% weight of hexamethylenetetramine, it is observed that the formation of gel begins at 24 hours maintaining its maximum rigidity for 648 hours and from this moment the degradation of the gel begins.

According to the table of resistance to the inversion movement in a glass tube, development by Robert Sydanks in 1988, Table 1, it qualitatively indicates the change in the resistance to movement of the gel in a fraction time.

Figure 11:
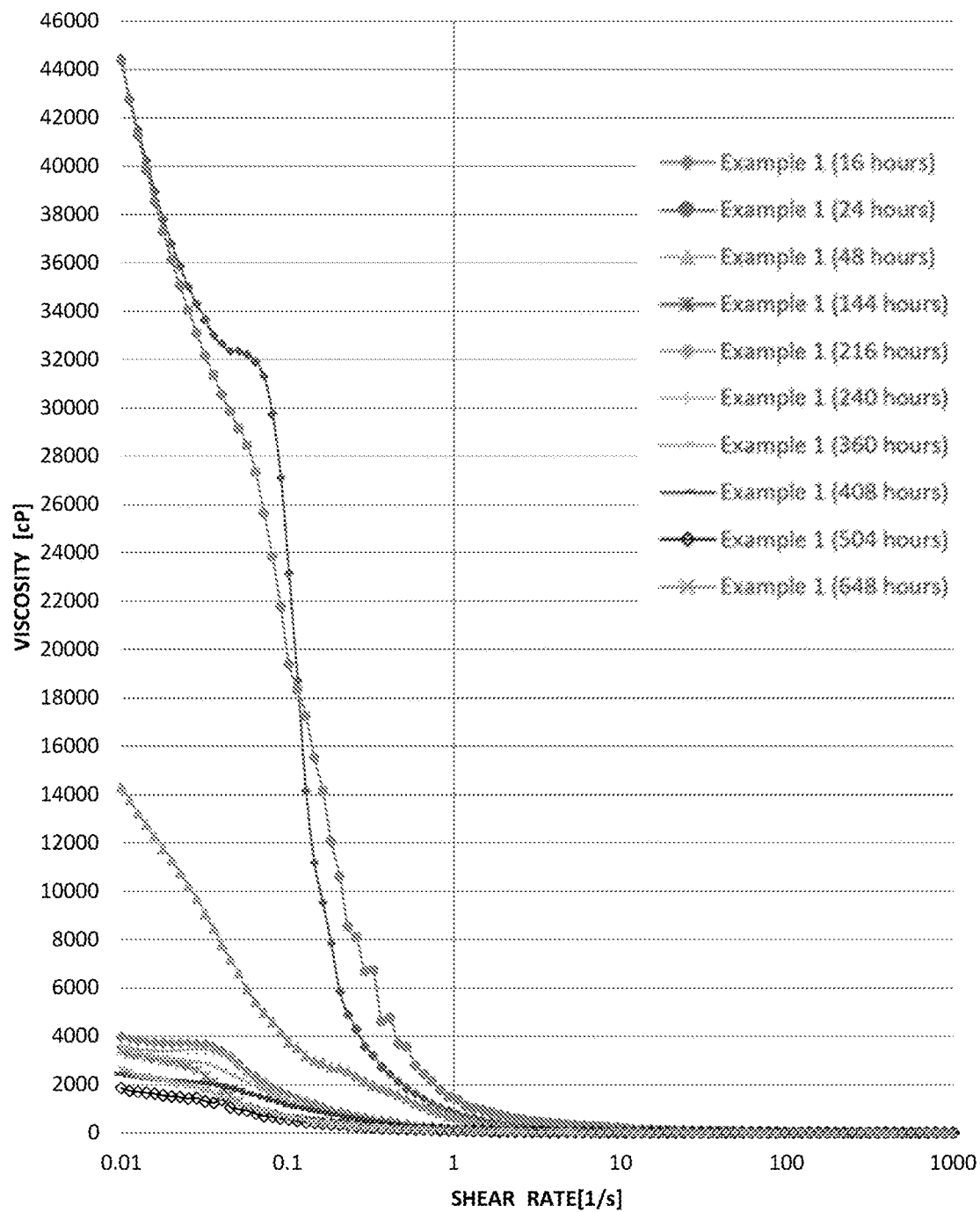
FIG. 11 shows viscosity curves at different residence times of the formulation described in example 1.

In FIG. 1. It shows the advance in the gel strength of the formulation described as a function time, for 22 hours the Sydanks code is 1, indicating that the solution has the same apparently viscosity (fluidity) as the polymeric solution, Increasing from 24 hours to 3, it indicates a detectable gel that flows to the surface of the container under immersion. After 144 hours, the Sydanks code is increased from code 3 to code 8 in 192 hours. The code 8 indicate the formation of a slightly deformable gel. After this time and up to approximately 648 hours, the code 8 is maintained. Finally, the degradation starts from this moment, as shown in FIG. 11.

Figure 2:
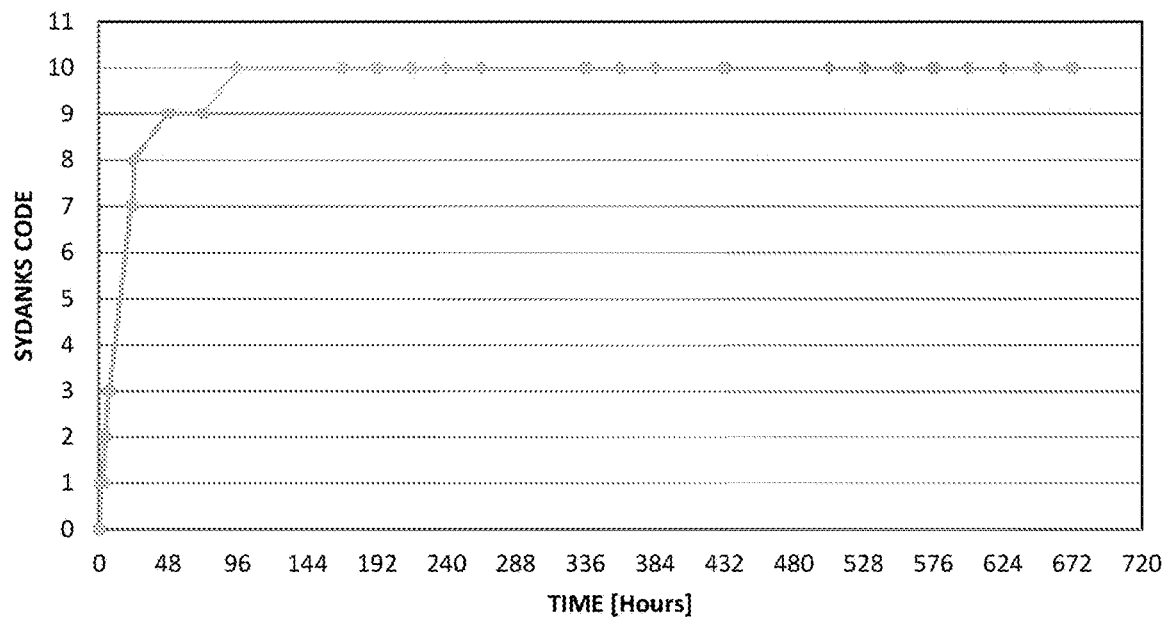
FIG. 2 Illustrates the resistance to inversion of the formulation described in Example 2 at 120° C. as a function of time, according to the description developed by Robert Sydanks (1988).

Example 2. In a 100 ml bottle equipped with a magnetic stirrer, 1.0% weight of sulfonic acid copolymer of tertiary butyl acrylamide (ATBS) and acrylamide, 0.4% weight of phenol and 0.6% weight of hexamethylenetetramine diluted at room temperature and atmospheric pressure, in 98 weight of reservoir brine with a total solids content of 31,870.50 ppm. In FIG. 2, the behavior of the code developed by Synanks (1988) of the aforementioned formulation at 120° C. as a function of time is shown; this is prepared with 1.0% by weight brine of the polyacrylamide described above, 0.4% weight of phenol. and at 0.6% weight of the hexamethylenetetramine, it is observed that the formation of the gel begins at 24 hours and maintaining its maximum rigidity during 672 hours and is from this moment starts the degradation of the gel.

According to the table of the investment resistance of movement in the glass tube, developed by Robert Sydanks in 1988, Table 1. Indicates the qualitative way to change the resistance movement of the gel in fraction time.

Figure 16:
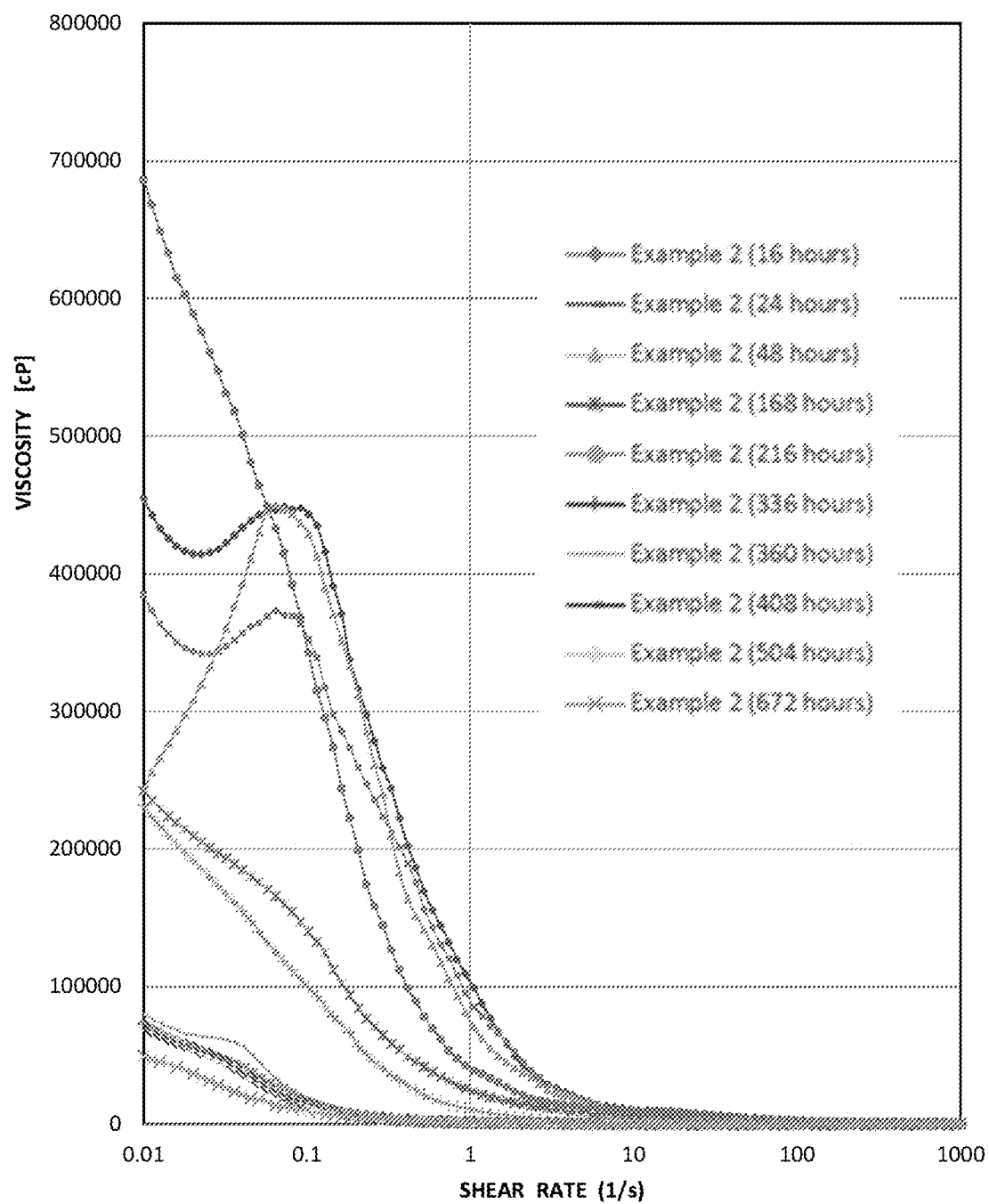
FIG. 16 shows viscosity curves at different residence times of the formulation described in example 2.

In FIG. 2, the advance of the gel of resistance of the formulation is shown, previously described as a function of time, during the first 24 hours, the code of Sydanks is 8, which indicates the formation of a slightly deformable gel and after of 96 hours the code is 10, this indicates The formation gel is rigid. At this time, the degradation begins as shown in FIG. 16.

2) Characterization of the Gel Formulation.

a) Viscosity measurement (21° C.). The viscosity was determined in the FANN 35A viscometer for the formulation described in example 1 and example 2, which is described in example 3 and example 4.

Figure 3:
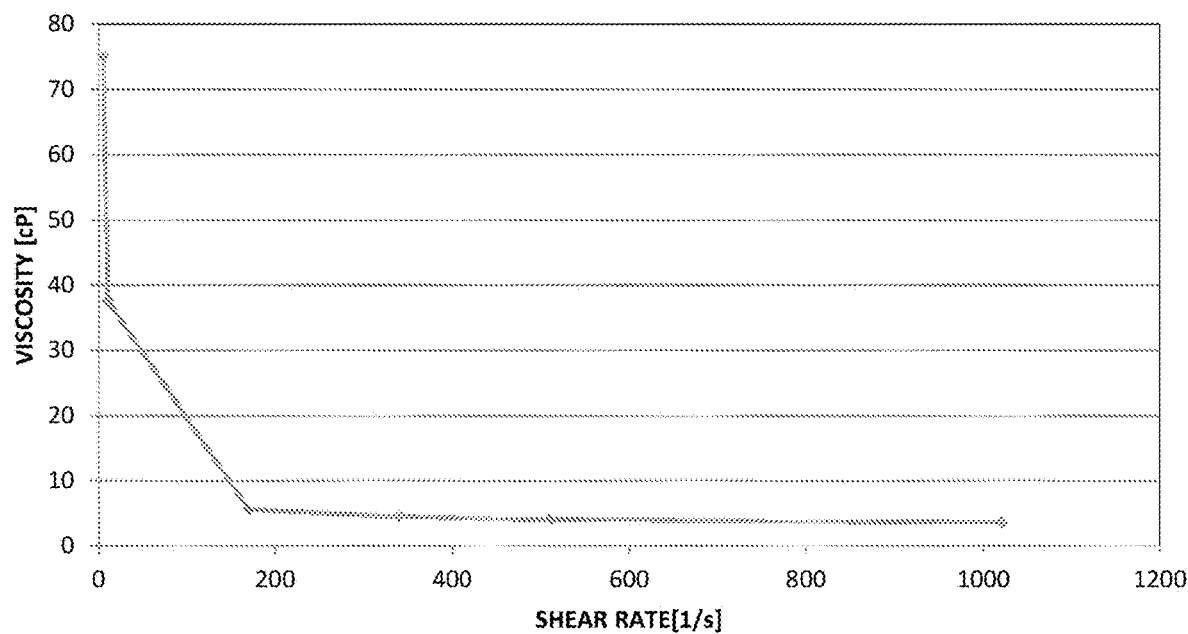
FIG. 3 shows a graph of the behavior of the viscosity with respect to the shear rate for the formulation of Example 1 at 21° C.
Figure 4:
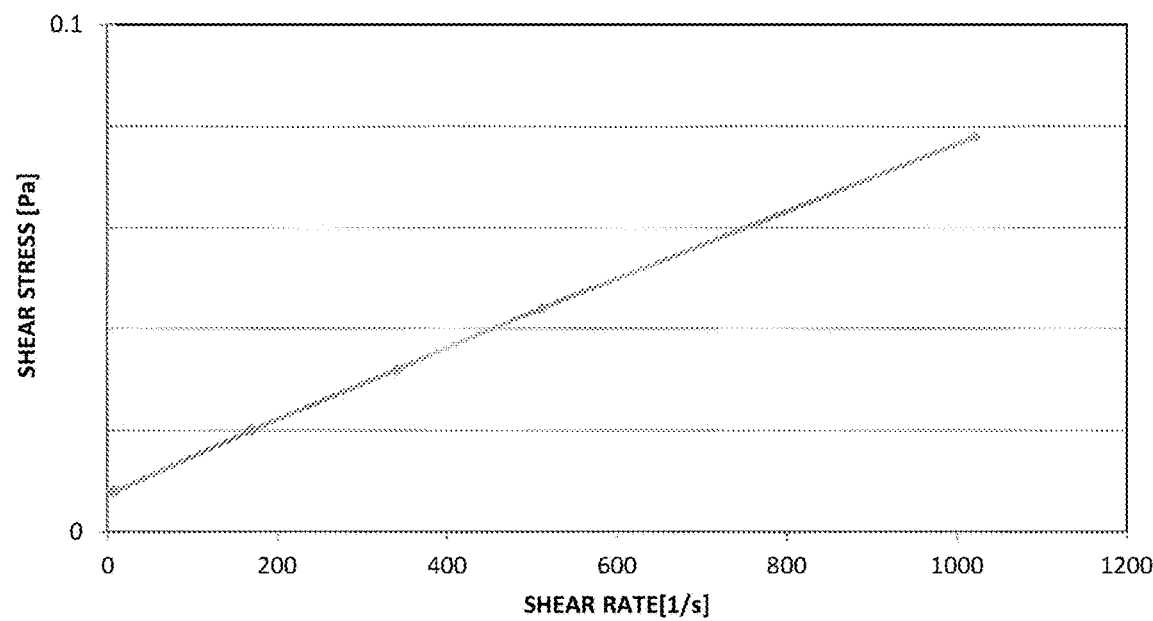
FIG. 4 shows a graph of the behavior of the shear stress with respect to the shear rate for the formulation of Example 1 at 21° C.

Example 3. For the development of the measurement of viscosity a solution was prepared as described in Example 1, the results obtained are shown in FIG. 3, which shows the behavior of the viscosity with respect to the shear rate for the formulation of example 1, in FIG. 4, the behavior of the shear stress with respect to the shear rate for the formulation of example 1 at 21° C. is presented, after the analysis of the results it was obtained that at room temperature it behaves as Pseudoplastic fluid or ShearThinning, this indicates that when this kind of fluid is subjected to shear stress, a variation of the viscosity is caused. The stronger the effort, the higher its viscosity to the point where the fluid offers great resistance to movement.

Figure 5:
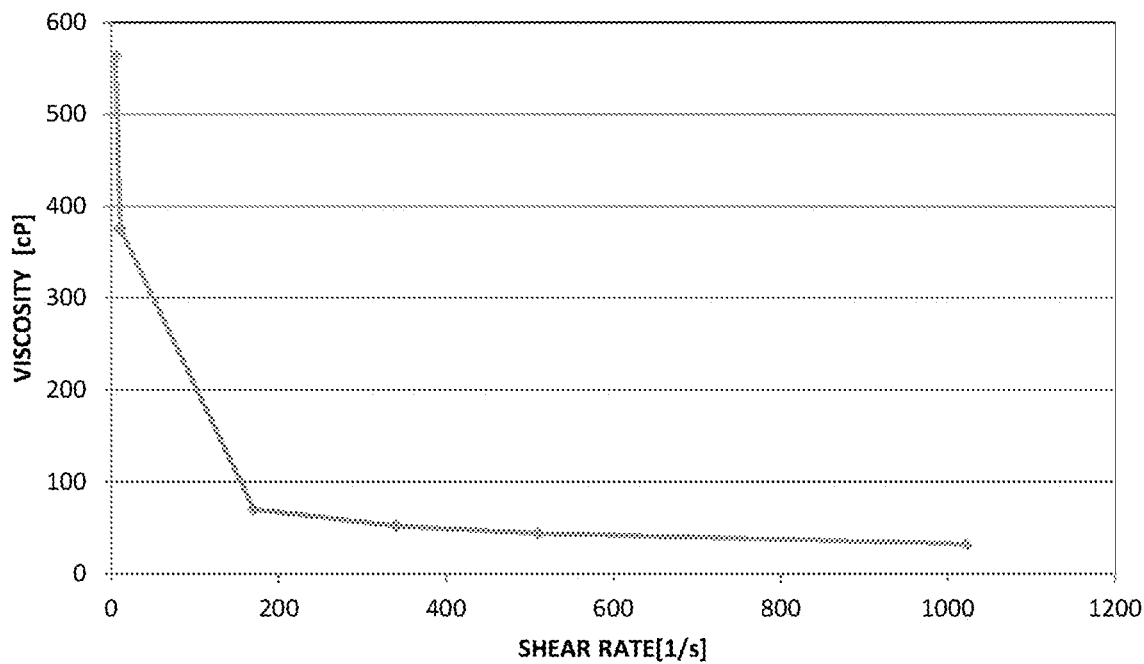
FIG. 5 shows a graph of the behavior of the viscosity with respect to the shear rate for the formulation of Example 2 at 21° C.
Figure 6:
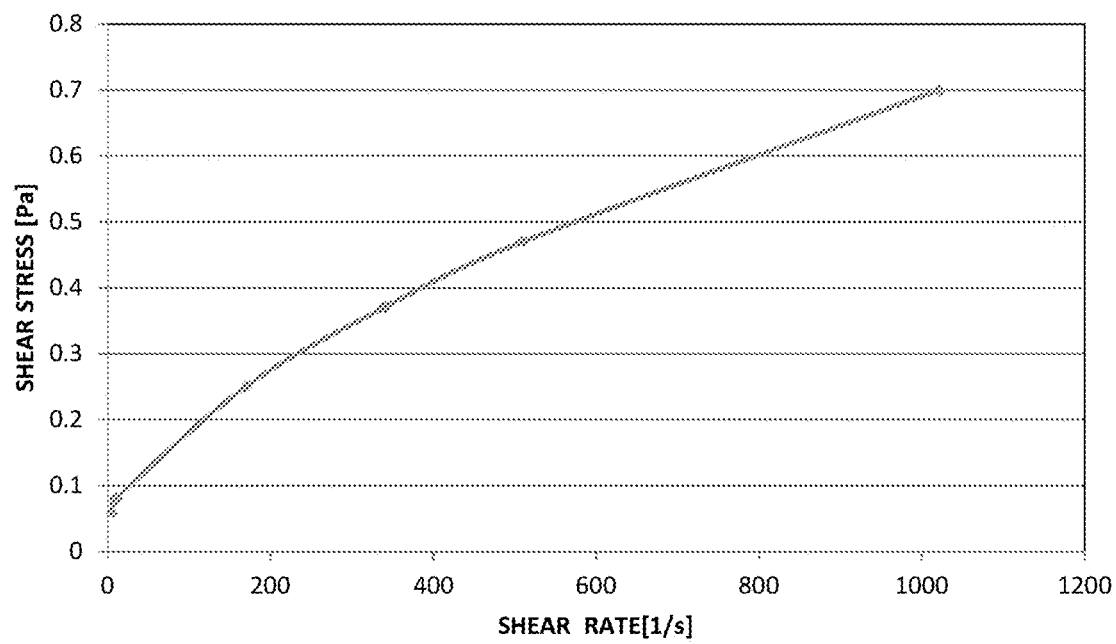
FIG. 6 shows a graph of the behavior of the shear stress with respect to the shear rate for the formulation of Example 2 at 21° C.

Example 4. For the development of the measurement of viscosity a solution was prepared as described in Example 2, the results obtained are shown in FIG. 5, which shows the behavior of the viscosity with respect to the shear rate for the formulation of example 2, in FIG. 6, the behavior of the shear stress with respect to the shear rate for the formulation of example 1 at 21° C. is presented, after the analysis of the results it was obtained that at room temperature it behaves as Pseudoplastic fluid or ShearThinning, this indicates that when this kind of fluid is subjected to shear stress, a variation of the viscosity is caused. The stronger the effort, the higher its viscosity to the point where the fluid offers great resistance to movement.

TABLE 1

Description of the resistance to investment movement developed by Robert Sydaks, (X).

| Code | Equivalent | Definition | Description |
|---|---|---|---|
| A | 1 | No detectable gel formed | The gel appears to have the same viscosity (fluidity) as the original polymer solution and no gel is visually detectable. |
| B | 2 | Highly flowing gel | The gel appears to be only slightly more viscous (less fluid) than the initial polymer solution. |
| C | 3 | Flowing gel | Most of the obviously detectable gel flows to the bottle cap upon inversion. |

TABLE 1-continued

Description of the resistance to investment movement developed by Robert Sydaks, (X).

Figure 7:
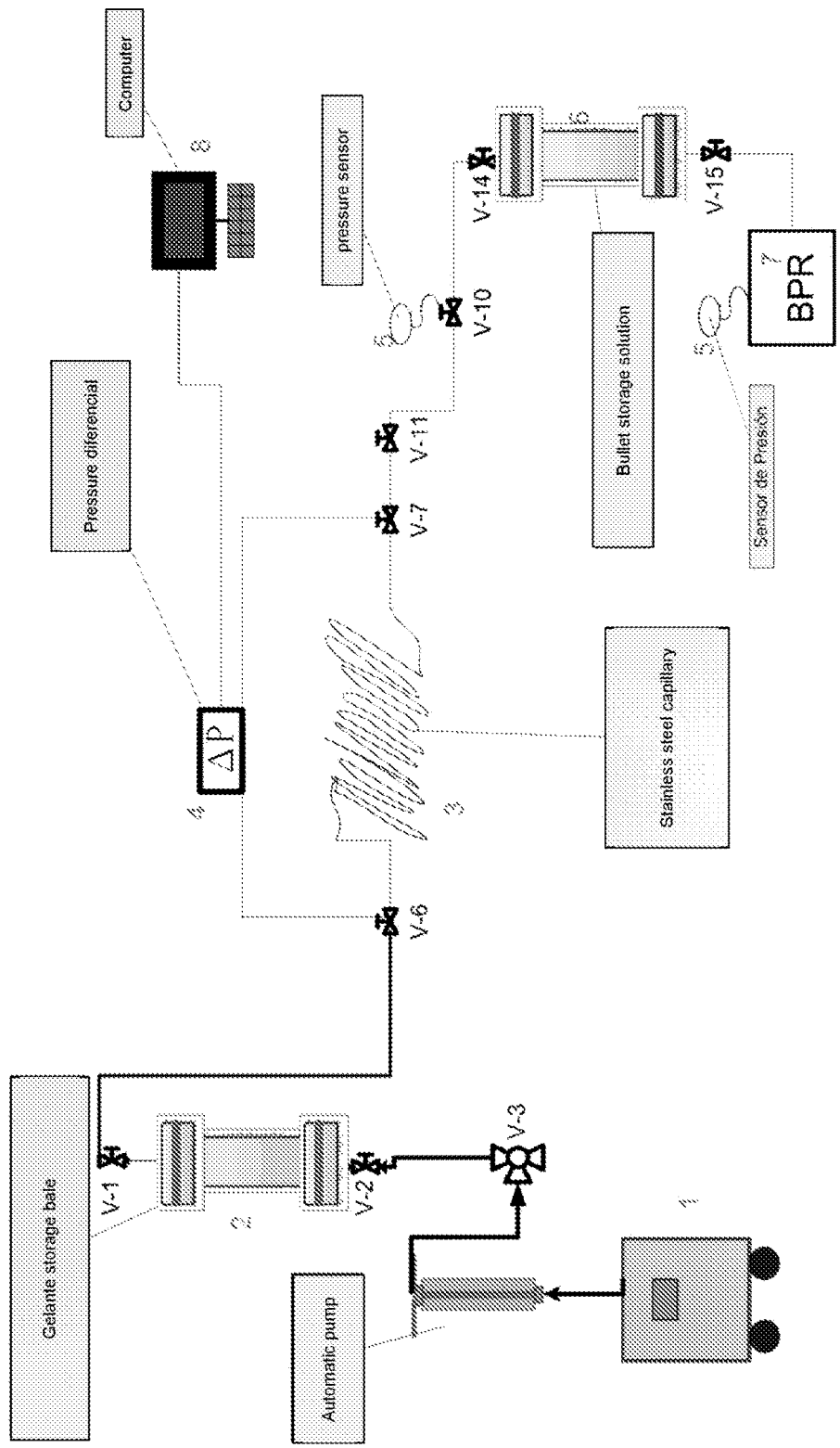
FIG. 7 shows a diagram of the viscosity measuring equipment for the determination of the rheological model.

| Code | Equivalent | Definition | Description |
|---|---|---|---|
| D | 4 | Moderately flowing gel | Only a small portion (about 5 to 12%) of the gel does not readily flow to the bottle cap upon inversion usually characterized as a tonguing gel (i.e., after hanging out of jar, gel can be made to flow back into bottle by slowly turning bottle upright). |
| E | 5 | Barely flowing gel | The gel can barely flow to the bottle cap and/or a significant portion (>15%) of the gel does not flow upon inversion. |
| F | 6 | Highly deformable not flowing gel | The gel does not flow to the bottle cap upon inversion. |
| G | 7 | Moderately deformable not flowing gel | The gel flows about half way down the bottle upon inversion. |
| H | 8 | Slightly deformable not flowing gel. | The gel surface only slightly deforms upon inversion. |
| I | 9 | Rigid gel | There is no gel-surface deformation upon inversion |
| J | 10 | Ringing rigid gel | A tuning-fork-like mechanical vibration can be felt after tapping the bottle. | b) Rheological model determination for example 1 at average reservoir conditions, pressure 2000 psi and temperature 120° C. The gelato injection system at average reservoir condition: 120° C. and 2000 psi, for application as fluid blockage is shown in FIG. 7 (Diagram of the viscosity measuring equipment for the determination of the rheological model), which consists of two cylinders of stainless steel with a capacity of 1,000 ml. this stores the solution gel to be used and another gellant used solution, and a stainless steel capillary, which has the following instrumentation: A) Differential pressure sensor, B) Pressure sensors, C) Temperature sensor and D) Computer for data analysis.

In this way, the gel injection procedure is as follows: A) Prepare the gel solution and fill the storage cylinder, B) Bring the system to the experimental temperature and monitor it by use of the temperature sensor, C) Opening of the sensor valves, which determines the differential pressure, D) Injection of the gelling formulation for the filling the lines, controlling the system with the pressurized pump, E) Determine the parameters (differential pressure, cutting force, cutting speed and Newtonian viscosity) necessary for the determination of the rheological model.

Figure 8:
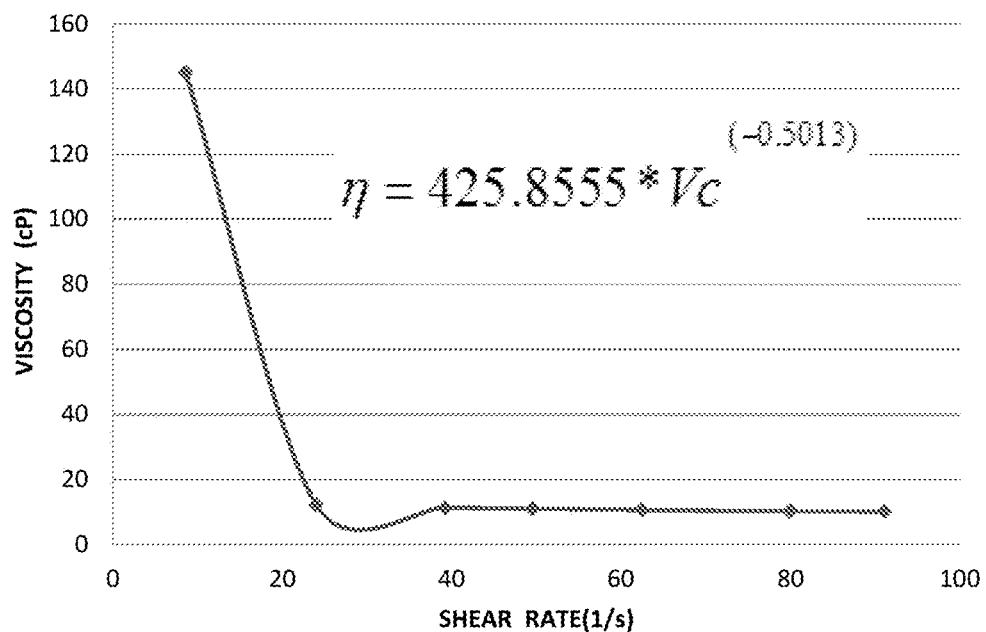
FIG. 8 illustrates the Rheological model of the gellant formulation described in Example 1 for shear rate ranges from 10 to 70 [1/s].
Figure 9:
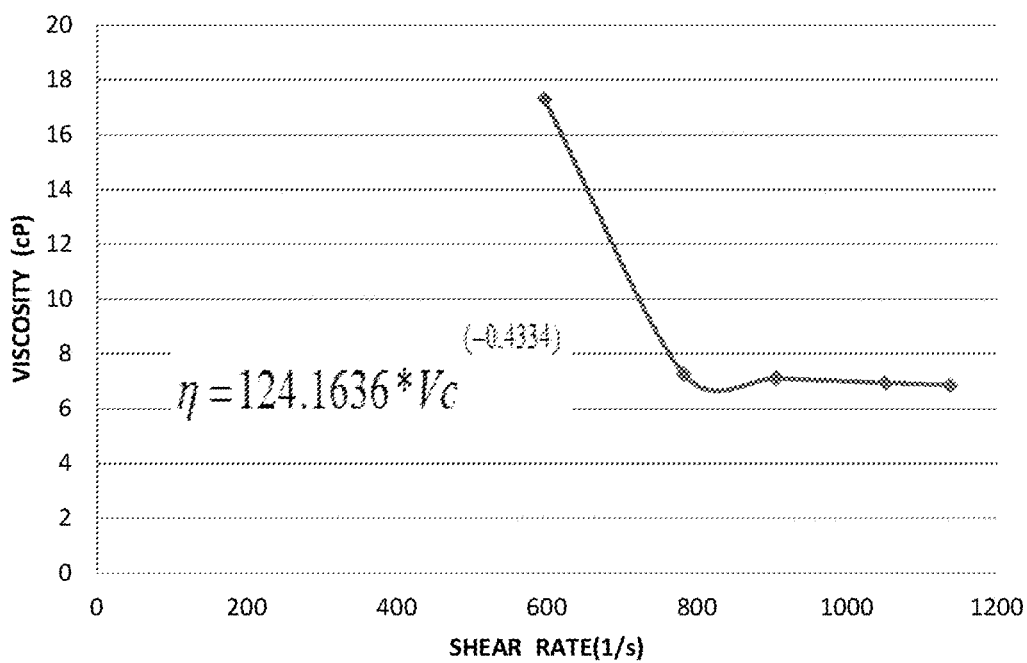
FIG. 9 shows the Rheological model of the gelling formulation, of the formulation described in example 1 for shear rate ranges from 600 to 1000 [1/s].

Example 5. Determination of the rheological model of the gallant formulation described in example 1. The shear rate intervals at which the experimental viscosity measurements were made from 10 to 70 (1/s), the rate from which were obtained the differentials pressure and shear rate are show in table 2, with the experimental data proceeds to the determination of the rheological model. For the case of the behavior of this fluid, it is observed that it has a behavior as a pseudoplastic fluid, for which the experimental data was adjusted to a power law method. With the equation shown in FIG. 8, it is possible to calculate data that were not obtained experimentally, it is worth mentioning that this equation is valid only for a set shear rate, for this particular case from 10 to 70 [1/s], below or above this interval another viscosity equation must be obtained. In FIG. 9, the q and K parameters of the power law model are observed, adjusting the experimental values.

Example 6. Determination of the rheological model of the gellant formulation described in example 1. The shear rate intervals at which the experimental viscosity measurements were made from 600 to 1,000 [1/s], the rate from which were obtained the differentials pressure and shear rate are shown in Table 3, with the experimental data proceeds to the determination of the rheological model. For the case of the behavior of this fluid, it is observed that it has a behavior as a pseudoplastic fluid, for which the experimental data was adjusted to a power law method. With the equation shown in FIG. 9, it is possible to calculate data that were not obtained experimentally, it is worth mentioning that this equation is valid only for a set shear rate, for this particular case from 600 to 1,000 [1/s], below or above this interval another viscosity equation must be obtained. In FIG. 9, the η and K parameters of the power law model are observed, adjusting the experimental values.

TABLE 2

Differential experimental pressure at shear rate from 10 to 70 (1/s) for determination of the rheological model

| Rate Q[cm³/h] | Differential Pressure ΔP [bar] | Shear rate γ[1/s] | Shear stress τ[Pa] | Viscosity η [cP] |
|---|---|---|---|---|
| 10 | 0.5372 | 10.0665 | 1.0164 | 100.9718 |
| 20 | 1.3205 | 20.0293 | 2.6019 | 124.7289 |
| 30 | 1.8534 | 30.0439 | 3.5065 | 116.7137 |
| 40 | 1.5337 | 40.0586 | 2.9017 | 72.4364 |
| 50 | 1.5821 | 50.0214 | 2.9932 | 59.8376 |
| 60 | 1.9899 | 59.9841 | 3.7648 | 62.7629 |
| 70 | 1.8229 | 70.0506 | 3.4489 | 49.2340 |

3) Monitoring of the Crosslinking and Permanence of the Gelling Formulation at 30° C. and Atmospheric Pressure, by Rheological Tests.

The analysis of the flow curve, viscosity curve, Damping Factor, elastic modulus and viscous modulus in Anton Paar rheometer model MCR501 at different dwell times, analyzed with the concentric cylinder geometry, 50 mm diameter parallel plate and Hollow Cylinder at 30° C., atmospheric pressure and shear rate (1/s): 0.1-1,000.

Figure 10:
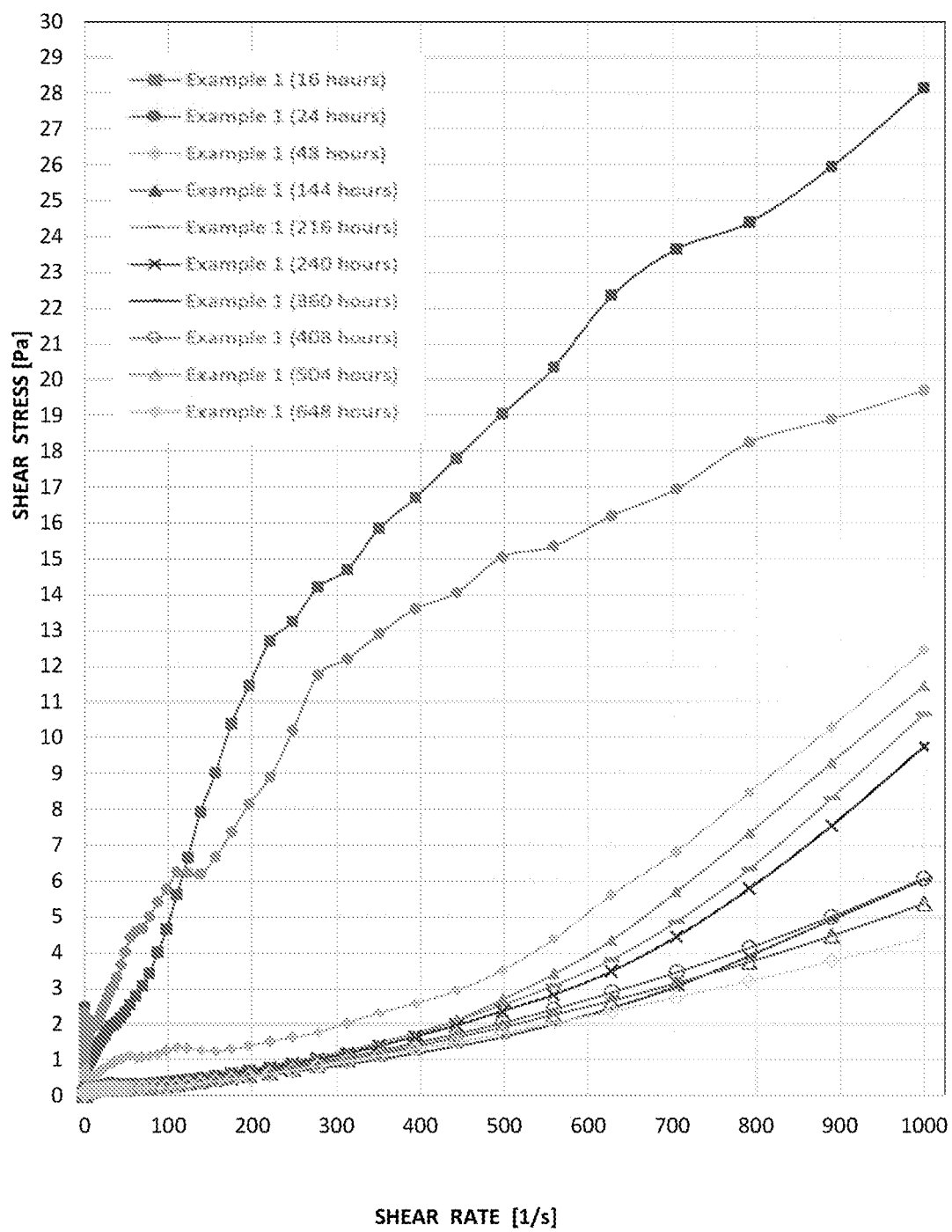
FIG. 10 shows flow curves at different residence times of the formulation described in example 1.

Example 7. To determine the flow curve, a gel solution was prepared as described in Example 1, the results obtained are shown in FIG. 10 (Flow curves at different residence times of the formulation described in Example 1), when observing the graph of the shear stress with respect to the shear rate, we have a fluid with pseudoplastic behavior. Example 8. To determine the viscosity curve, a gel solution was prepared as described in Example 1, the results obtained are shown in FIG. 11 (Viscosity curves at different residence times of the formulation described in Example 1), when observing the different viscosity curves, it dependents on the shear stress in different residence times of the gel sample, this is a pseudoplastic behavior, indicated that this material is submitted to the shear rate and decrease viscosity.

TABLE 3

Differential experimental pressure at shear rate from 600 to 1000 (1/s) for determination of the rheological model.

| Rate Q[cm³/h] | Differential Pressure ΔP [bar] | Shear rate γ[1/s] | Shear stress τ[Pa] | Viscosity η [cP] |
|---|---|---|---|---|
| 600 | 2.3571 | 622.6724 | 4.4595 | 7.1618 |
| 715 | 2.9678 | 742.0180 | 5.6149 | 7.5670 |
| 800 | 3.2325 | 830.2299 | 6.1156 | 7.3662 |
| 900 | 3.5167 | 934.0086 | 6.6533 | 7.1234 |
| 1000 | 3.2827 | 1037.7874 | 6.2105 | 5.9844 |

Figure 12:
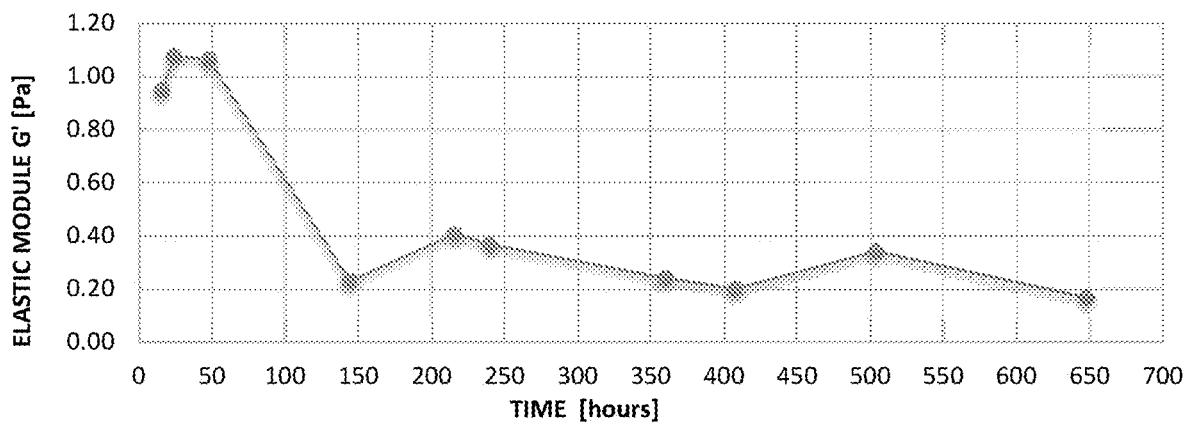
FIG. 12 presents a graph of the elastic modulus versus time of the formulation described in example 1.

Example 9. To determine the modulus of elasticity or also known as storage modulus [G'], which indicates how much deformation energy is stored during a cutting process, a gel solution was prepared as described in Example 1, The results obtained are shown in FIG. 12 (Graph of the elastic modulus as a function of time for the formulation described in Example 1), observing the increase of the elastic modulus in time according to the scheme of residence time required for this gel.

Figure 13:
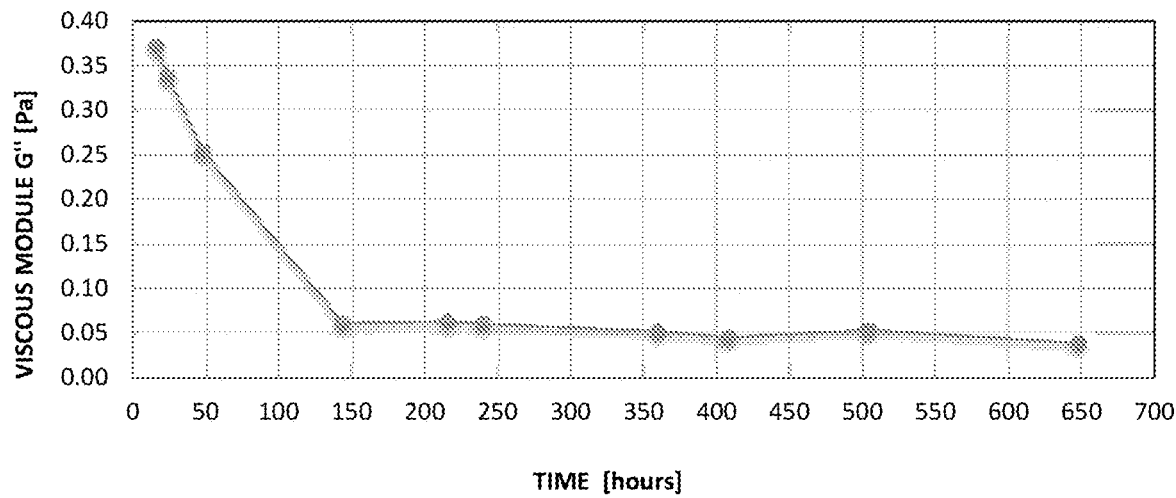
FIG. 13 presents a graph of the viscous modulus versus time of the formulation described in example 1.
Figure 14:
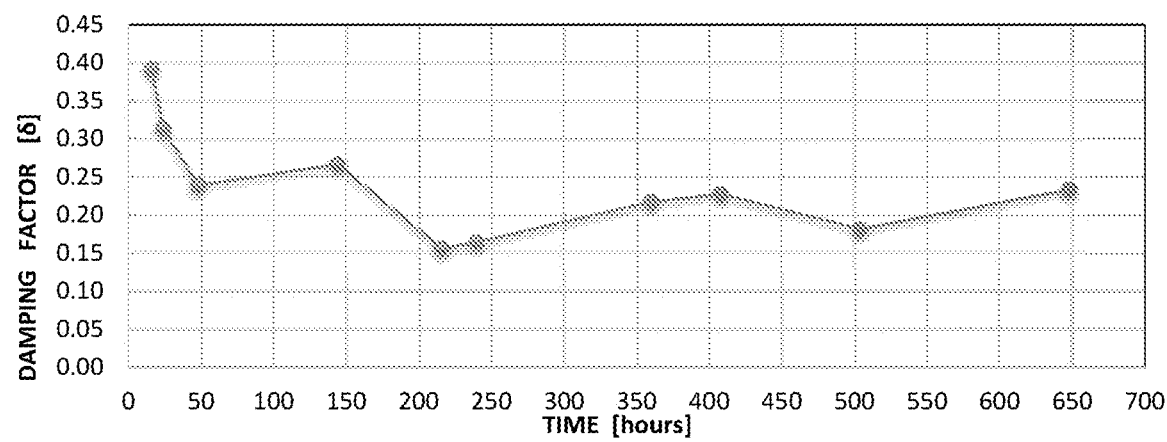
FIG. 14 illustrates a graph of Damping factor versus time of the formulation described in example 1.

Example 10. To determine the viscous modulus or also known as the loss modulus [G'], which indicates the energy of deformation used by the sample during and after a shear or stressing process, a gel solution was prepared as described in example 1, the results are shown in FIG. 13 (Graphs of the Viscoso Modulus versus the time for the formulation of Example 1), it is observed how the energy of the sample is exhausted by the change of its structure until the time of 648 hours Example 11. The damping factor relates the viscous behavior [G'] and the elastic behavior [G'] is defined as the tan δ=G"/G', if the quotient of the modulus is <1 the character the material is considered a gel, if the quotient of the modulus >1 the character the material is liquid and if the quotient of the modulus is =0 this is at its gel point. For the determination of the Damping factor a solution described in example 1 is prepared, the results obtained are show in FIG. 14 (plot of the Damping factor versus the time of formulation of example 1), which indicates that it is a material with GEL character since the ratio of the elastic modulus is greater in relation to the viscous modulus.

Figure 15:
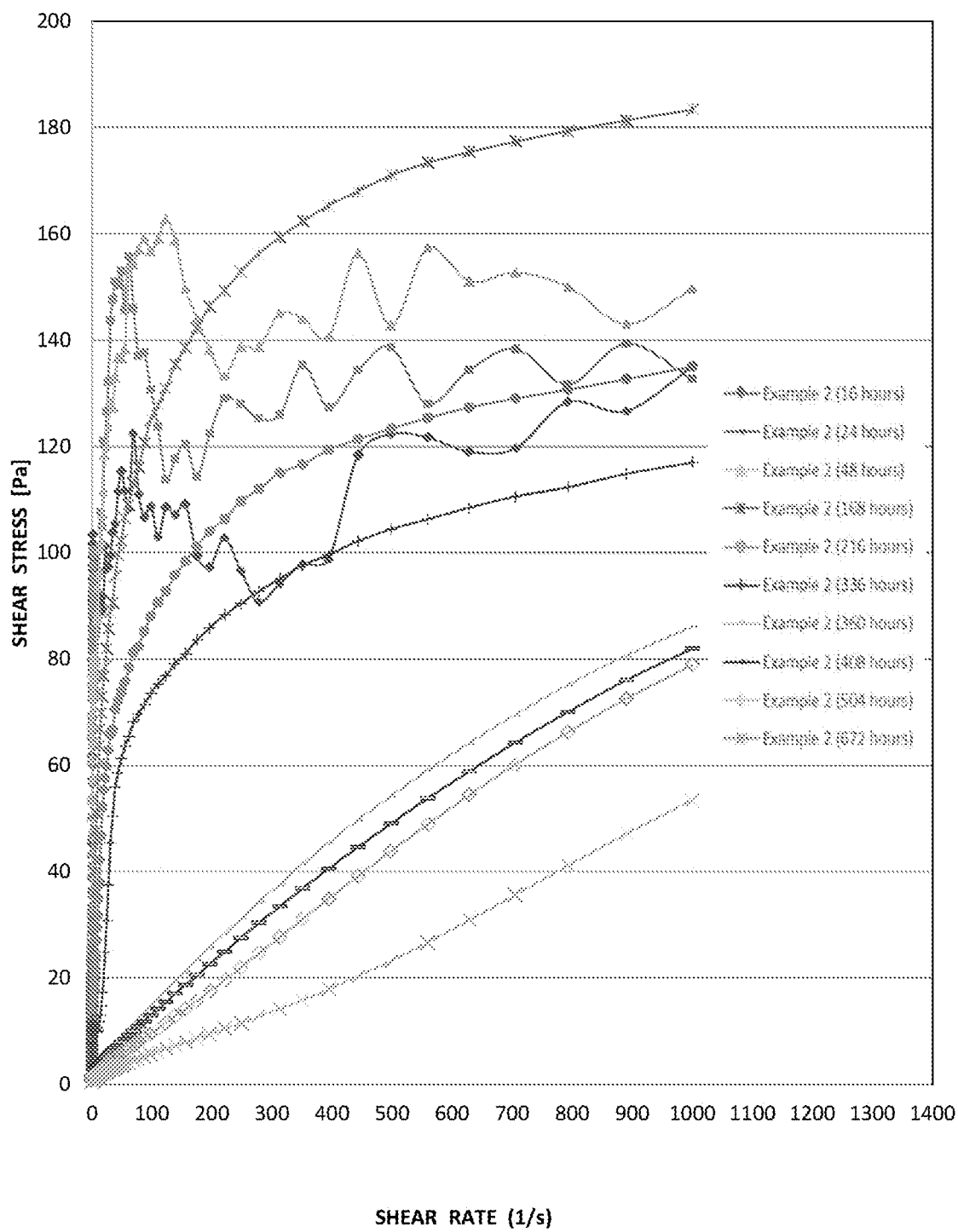
FIG. 15 shows flow curves at different residence times of the formulation described in example 2.

Example 12. To determine the flow curve, a gellant solution was prepared as described in Example 2, the results obtained are shown in FIG. 15 (Flow curves at different residence times of the formulation described in Example 2), when observing the graph of the shear stress with respect to the shear rate, we have a fluid with pseudoplastic behavior.

Example 13. For the determination of the viscosity curve a solution was prepared as described in example 2, the results obtained are shown in FIG. 16 (Viscosity curves at different residence times of the formulation of example 2), observing the different viscosity curves dependent on the shear stress at different dwell times of the GEL sample, this presents a pseudoplastic behavior, indicating that when the material is subjected to a shearing stress, its viscosity decreases.

Figure 17:
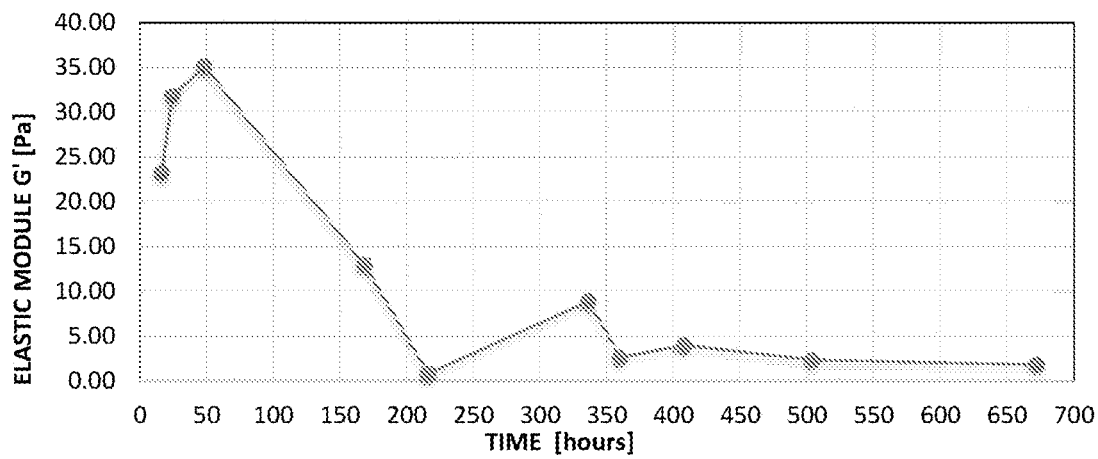
FIG. 17 presents a graph of the elastic modulus versus time of the formulation described in example 2.

Example 14. For the determination of the elastic modulus a solution described in Example 2 was prepared, the results obtained are shown in FIG. 17 (Graph of the Elastic Modulus versus time for the formulation of Example 2).

Figure 18:
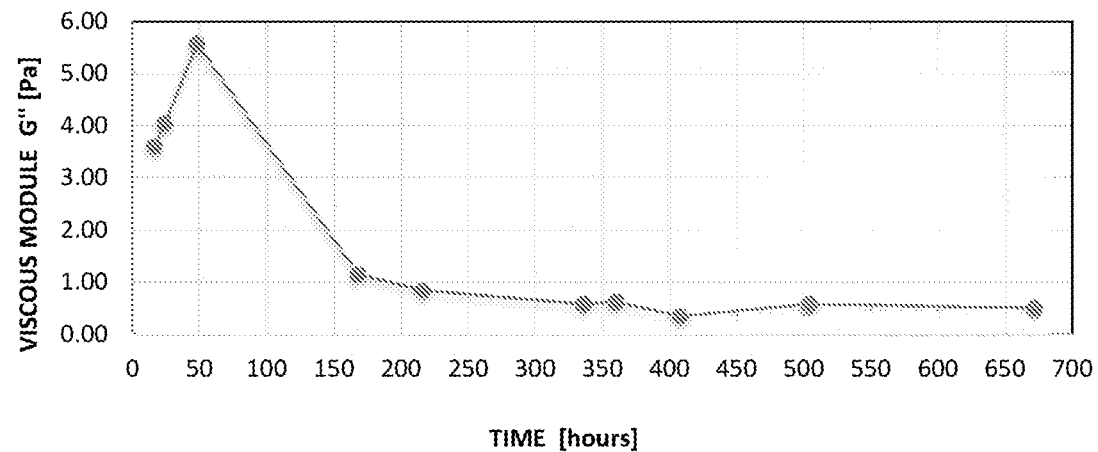
FIG. 18 presents a graph of the viscous modulus versus time of the formulation described in example 2.

Example 15. For the determination of the viscous modulus, a solution described in Example 2 was prepared, the results obtained are shown in FIG. 18 (Graph of the Viscose Modulus versus time for the formulation of Example 2).

Figure 19:
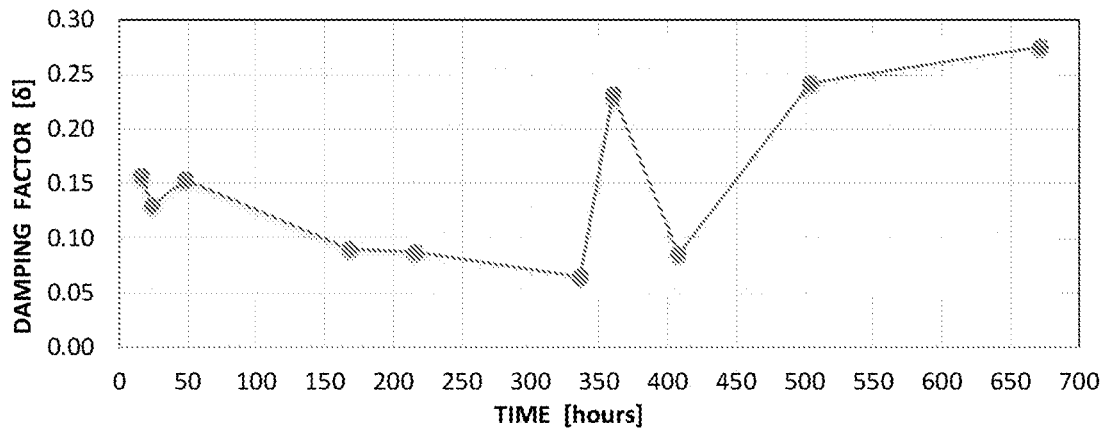
FIG. 19 illustrates a graph of Damping factor versus time of the formulation described in example 2.

Example 16. For the determination of the Damping Factor a solution described in Example 2 was prepared, the results obtained are shown in FIG. 19 (Graph of the Damping Factor versus time of the formulation of Example 2), which indicates that it is a material with GEL character since the ratio of the elastic modulus is greater in relation to the viscous modulus. However, a maximum increase in the Damping factor is observed at the time of 672 hours which indicates a degradation of the material as it behaves more and more like a liquid than an elastic material.

Example 17. According to the table of resistance to the inversion movement in a glass tube, developed by Robert Sydanks in 1988, Table 1, the change in the resistance to movement of the gel in a fraction of time is qualitatively indicated.

In FIG. 20, It shows the advance in gel strength of the formulation described in Example 1 and Example 2 as a function of time for two waters with different salinities. The first water, called congenital water, contains a higher hardness content such as calcium carbonate of approximately 7.283 ppm, a low sulphate value, approximately 240 ppm, a chloride content of 19.343 ppm and a pH of 6.61. While for the water called Water Sea, the hardness content reaches only 1,022 ppm, a significant content of sulfates with 3,058 ppm, a content of chlorides of 18,018 ppm and its pH is 8.1. All these variations of the content of cations and anions, provide for the case of the formulations developed in the example 1 and 2, a slight increase in its code of resistance to movement according to the methodology developed by R. Sydanks in 1988 for when they are formulated in the water called Water Sea, which with water called congenital water.

REFERENCES (1) Lockhart, T. P., SPE, paper 20998, 1991.
(2) Seright, R. S., *SPE*; paper 80200, 2003.
(3) Simjoo, M., *SPE; paper* 122280, 2009.
(4) Moradi-Araghi, A., Doe, P.H., *SPE*, paper 13033, 1984.
(5) Moradi-Araghi, A., Doe, P, *SPEREJ* 2 (2), 1987.
(6) Moradi-Araghi, A., *SPE*,paper 27826, 1994.
(7) Hardy, M. B., Botermans, C. W., Hamouda, A., Valda, J., John, W., *SPE*, paper 50738, 1999.
(8) Albonico, P., *SPE*, paper 28983, 1995.
(9) R. D. Sydansk, R. D.; SPE/COE 17329, 1988.

The invention claimed is:

1. A composition of organic gel formulations with improved stability, which is configured to isolate an area of a naturally fractured carbonated reservoir, the composition comprising:
  0.3 to 1% by weight of a copolymer of acrylamide butyl tertiary of sulfonic acid and acrylamide; and
  0.12 to 0.4% by weight of phenol and from 0.18 to 0.6% by weight of hexamethylenetetramine;
  wherein the organic gel formulation comprises a colloidal system having a solid continuous phase and a dispersed liquid phase formed over a period of at least about 20 hours to provide temporary isolation of the area of the naturally fractured carbonated reservoir.

2. The composition of claim 1, wherein the colloidal system having the solid continuous phase and the dispersed liquid phase is formed over a period of about 24 hours.

3. The composition of claim 1, wherein the colloidal system having the solid continuous phase and the dispersed liquid phase is formed at a temperature of about 120° C.

4. The composition of claim 1, wherein the colloidal system having the solid continuous phase and the dispersed liquid phase maintains a maximum rigidity for up to about 648 hours and commences degradation thereafter.

5. The composition of claim 1, wherein the colloidal system having the solid continuous phase and the dispersed liquid phase maintains a maximum rigidity for up to about 672 hours and commences degradation thereafter.

6. The composition of claim 1, wherein the colloidal system having the solid continuous phase and the dispersed liquid phase maintains a maximum rigidity for at least about 96 hours and commences degradation thereafter.

7. The composition of claim 1, wherein the colloidal system having the solid continuous phase and the dispersed liquid phase acts as a fluid reservoir for blocking fluid flow from the isolated area of naturally fractured carbonated reservoir at a temperature of up to about 120° C. and a pressure of up to about 2000 psi.

8. The composition of claim 1, wherein the colloidal system having the solid continuous phase and the dispersed liquid phase acts as a fluid reservoir for blocking fluid flow from the isolated area of naturally fractured carbonated reservoir at a temperature of up to about 120° C. and a fluid salinity of up to about 31,870 ppm.

\* \* \* \* \*